US012574485B2

(12) United States Patent　　　　　(10) Patent No.:　　US 12,574,485 B2
Horikawa　　　　　　　　　　　　　　　(45) Date of Patent:　　Mar. 10, 2026

(54) PROJECTION IMAGE ADJUSTMENT METHOD, PROJECTION SYSTEM, AND NON-TRANSITORY COMPUTER-READABLE STORAGE MEDIUM STORING PROGRAM

(71) Applicant: SEIKO EPSON CORPORATION, Tokyo (JP)

(72) Inventor: Fumiya Horikawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 328 days.

(21) Appl. No.: 18/383,305

(22) Filed: Oct. 24, 2023

(65) Prior Publication Data

US 2024/0137476 A1　　Apr. 25, 2024
US 2024/0236280 A9　　Jul. 11, 2024

(30) Foreign Application Priority Data

Oct. 25, 2022　(JP) ................................ 2022-170666

(51) Int. Cl.
*H04N 9/31*　　　　(2006.01)
(52) U.S. Cl.
CPC ................................ *H04N 9/3179* (2013.01)
(58) Field of Classification Search
CPC .. H04N 9/3179; H04N 9/3147; H04N 9/3194; H04N 9/3182
See application file for complete search history.

(56) References Cited

U.S. PATENT DOCUMENTS

| | | | | |
|---|---|---|---|---|
| 3,541,541 A | * | 11/1970 | Engelbart | ........... G06F 3/03543 |
| | | | | 340/870.07 |
| 5,861,881 A | * | 1/1999 | Freeman | ................ H04H 20/30 |
| | | | | 348/E7.071 |
| 7,526,362 B2 | * | 4/2009 | Kim | ..................... G05D 1/0033 |
| | | | | 701/28 |
| 7,712,125 B2 | * | 5/2010 | Herigstad | .......... H04N 21/4755 |
| | | | | 725/38 |
| 8,830,067 B2 | * | 9/2014 | Igaki | ....................... G06F 3/017 |
| | | | | 340/693.11 |

(Continued)

FOREIGN PATENT DOCUMENTS

| | | |
|---|---|---|
| JP | 2002-116500 A | 4/2002 |
| JP | 2014-137386 A | 7/2014 |
| JP | 2021-064848 A | 4/2021 |

*Primary Examiner* — Michael B. Pierorazio
(74) *Attorney, Agent, or Firm* — OLIFF PLC

(57)　　　　　　ABSTRACT
A projection image adjustment method includes acquiring a captured image produced by capturing an image of a range containing a first and second region in a situation wherein a first projector projects a first image having uniform luminance toward a first region and a second projector projects a second image having uniform luminance toward a second region overlapping part of the first region, identifying based on the captured image the brightness at a third region where the first region and the second region overlap each other, and the brightness at a fourth region that is part of the first region and does not overlap with the second region, adjusting the first image when the fourth region is darker than the third region, and not performing correction that adjusts the first image to increase the highest brightness at the fourth region when the fourth region is brighter than the third region.

10 Claims, 10 Drawing Sheets

(56) References Cited

U.S. PATENT DOCUMENTS

| | | | | | |
|---|---|---|---|---|---|
| 8,893,164 | B1 * | 11/2014 | Teller | G06Q 30/0252 | 725/12 |
| 10,616,541 | B2 * | 4/2020 | Oike | H04N 9/3182 | |
| 11,134,230 | B2 * | 9/2021 | Naganuma | G09G 5/10 | |
| 2002/0041364 | A1 | 4/2002 | Ioka | | |
| 2002/0085843 | A1 * | 7/2002 | Mann | E03C 1/057 | 396/374 |
| 2006/0064733 | A1 * | 3/2006 | Norton | H04N 21/42646 | 725/135 |
| 2006/0256133 | A1 * | 11/2006 | Rosenberg | G06F 3/013 | 345/619 |
| 2007/0124775 | A1 * | 5/2007 | DaCosta | H04N 21/6582 | 348/E7.071 |
| 2009/0067847 | A1 * | 3/2009 | Nakamura | G08C 23/04 | 398/128 |
| 2010/0020752 | A1 * | 1/2010 | Anschutz | H04W 4/023 | 370/328 |
| 2010/0088735 | A1 * | 4/2010 | Sadja | H04N 21/4722 | 725/116 |
| 2010/0192173 | A1 * | 7/2010 | Mizuki | H04N 21/4312 | 725/115 |
| 2011/0072448 | A1 * | 3/2011 | Stiers | H04N 21/44204 | 725/10 |
| 2011/0239266 | A1 * | 9/2011 | Brooks | H04B 10/85 | 398/141 |
| 2012/0075168 | A1 * | 3/2012 | Osterhout | G06F 3/017 | 345/8 |
| 2012/0093481 | A1 * | 4/2012 | McDowell | G11B 27/322 | 348/143 |
| 2012/0222057 | A1 * | 8/2012 | Sadowsky | H04N 21/4223 | 725/10 |
| 2012/0222058 | A1 * | 8/2012 | el Kaliouby | H04N 21/251 | 725/10 |
| 2012/0324491 | A1 * | 12/2012 | Bathiche | H04N 21/42201 | 725/10 |
| 2012/0324492 | A1 * | 12/2012 | Treadwell, III | H04H 60/45 | 725/10 |
| 2012/0324493 | A1 * | 12/2012 | Holmdahl | H04N 21/252 | 725/86 |
| 2012/0324494 | A1 * | 12/2012 | Burger | H04N 21/25891 | 725/12 |
| 2013/0097643 | A1 * | 4/2013 | Stone | A63F 13/44 | 725/61 |
| 2015/0052555 | A1 * | 2/2015 | Lian | G06F 3/04842 | 725/37 |
| 2018/0139422 | A1 | 5/2018 | Moule et al. | | |
| 2022/0368872 | A1 * | 11/2022 | Shishido | H04N 9/3194 | |
| 2024/0129423 | A1 * | 4/2024 | Nishimori | H04N 9/3194 | |
| 2024/0333896 | A1 * | 10/2024 | Tsuji | G09G 5/377 | |

* cited by examiner

1

PROJECTION IMAGE ADJUSTMENT METHOD, PROJECTION SYSTEM, AND NON-TRANSITORY COMPUTER-READABLE STORAGE MEDIUM STORING PROGRAM

The present application is based on, and claims priority from JP Application Serial Number 2022-170666, filed Oct. 25, 2022, the disclosure of which is hereby incorporated by reference herein in its entirety.

BACKGROUND

1. Technical Field

The present disclosure relates to a projection image adjustment method, a projection system, a processing apparatus, and a non-transitory computer-readable storage medium storing a program.

2. Related Art

JP-A-2014-137386 discloses an image projection system that causes two projection images to partially overlap with each other on a projection surface. In the image projection system, an overlap region where the two projection images overlap with each other and a non-overlap region where the two projection images do not overlap with each other are created on the projection surface. The image projection system at least performs correction that increases the highest luminance at the non-overlap region. The image projection system performs the correction to reduce the difference in brightness between the non-overlap region and the overlap region in such a way that the brightness at the overlap region and the brightness at non-overlap region are equal to each other. The technology disclosed in JP-A-2014-137386 is effective when the non-overlap region before the correction is darker than the overlap region.

JP-A-2014-137386 is an example of the related art.

Depending on the shape of the projection surface, the non-overlap region before the correction is brighter than the overlap region in some cases. In the situation in which the non-overlap region before the correction is brighter than the overlap region, performing the correction disclosed in JP-A-2014-137386 may undesirably increase at least the highest luminance at the non-overlap region, resulting in a more noticeable difference in brightness between the non-overlap region and the overlap region. It is therefore desired to provide a technology capable of suppressing the correction that causes a more noticeable difference in brightness between the non-overlap region and the overlap region when the non-overlap region is brighter than the overlap region.

SUMMARY

A projection image adjustment method according to an aspect of the present disclosure includes acquiring a captured image produced by capturing an image of a range containing a first region and a second region in a situation in which a first projector projects a first image having uniform luminance toward a first region of a projection surface and a second projector projects a second image having uniform luminance toward a second region that is part of the projection surface and has a portion that overlaps with part of the first region, identifying based on the captured image brightness at a third region where the first region and the second region overlap with each other, and brightness at a fourth region that is part of the first region and does not overlap with the second region, adjusting the first image when the fourth region is darker than the third region, and not performing correction that adjusts the first image to increase highest brightness at the fourth region when the fourth region is brighter than the third region.

A projection system according to another aspect of the present disclosure includes a first projector that projects a first image having uniform luminance toward a first region of a projection surface, a second projector that projects a second image having uniform luminance toward a second region that is part of the projection surface and has a portion that overlaps with part of the first region, a camera that produce a captured image by capturing an image of a range containing the first region and the second region in a situation in which the first image is projected toward the first region and the second image is projected toward the second region, and a processing apparatus that performs acquisition of the captured image, identification, based on the captured image, of brightness at a third region where the first region and the second region overlap with each other, and brightness at a fourth region that is part of the first region and does not overlap with the second region, and adjustment of the first image when the fourth region is darker than the third region, and does not perform correction that increases highest brightness at the fourth region by adjusting the first image when the fourth region is brighter than the third region.

A processing apparatus according to another aspect of the present disclosure performs acquisition of a captured image produced by capturing an image of a range containing a first region and a second region in a situation in which a first projector projects a first image having uniform luminance toward a first region of a projection surface and a second projector projects a second image having uniform luminance toward a second region that is part of the projection surface and has a portion that overlaps with part of the first region, identification, based on the captured image, of brightness at a third region where the first region and the second region overlap with each other, and brightness at a fourth region that is part of the first region and does not overlap with the second region, and adjustment of the first image when the fourth region is darker than the third region, and does not perform correction that increases highest brightness at the fourth region by adjusting the first image when the fourth region is brighter than the third region.

A non-transitory computer-readable storage medium storing a program according to another aspect of the present disclosure causes a computer to perform acquisition of a captured image produced by capturing an image of a range containing a first region and a second region in a situation in which a first projector projects a first image having uniform luminance toward a first region of a projection surface and a second projector projects a second image having uniform luminance toward a second region that is part of the projection surface and has a portion that overlaps with part of the first region, identification, based on the captured image, of brightness at a third region where the first region and the second region overlap with each other, and brightness at a fourth region that is part of the first region and does not overlap with the second region, and adjustment of the first image when the fourth region is darker than the third region, and causes the computer not to perform correction that increases highest brightness at the fourth region by adjusting the first image when the fourth region is brighter than the third region.

DESCRIPTION OF EMBODIMENTS

A: First Embodiment

A1: Overview of Projection System 1

Figure 1:
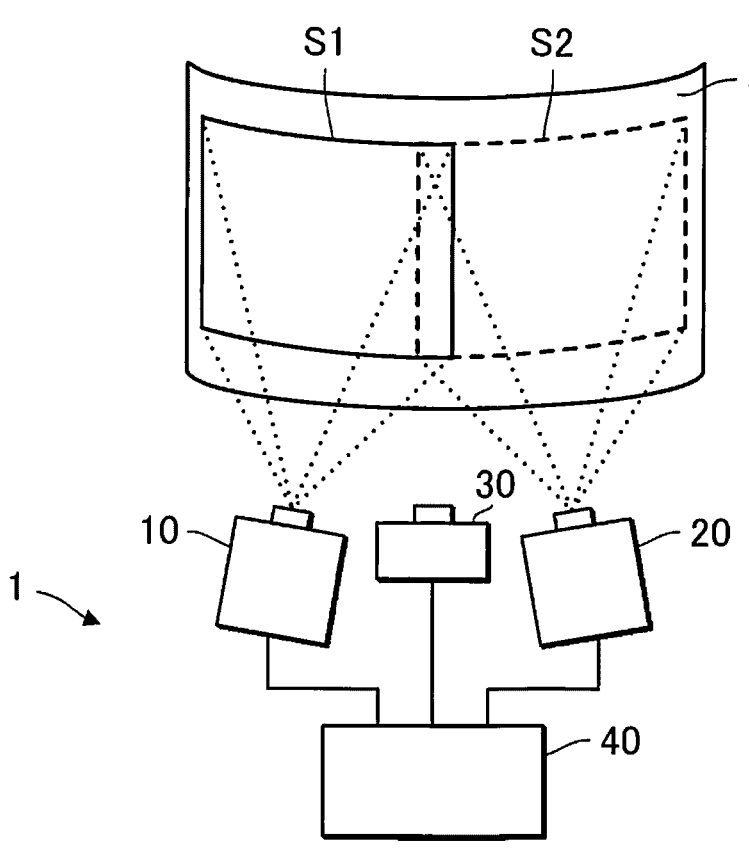
FIG. 1 is a diagrammatic view of a projection system according to a first embodiment.

FIG. 1 is a diagrammatic view of a projection system 1 according to a first embodiment. The projection system 1 projects images toward a projection surface S.

The projection surface S is a convex curved surface. The projection surface S is not limited to a convex curved surface. For example, the projection surface S may be a planar surface or a concave curved surface. The projection surface S has a first region S1 and a second region S2. The second region S2 has a portion that overlaps with part of the first region S1.

The projection system 1 includes a first projector 10, a second projector 20, a camera 30, and an information processing apparatus 40. The camera 30 may be incorporated in any of the information processing apparatus 40, the first projector 10, and the second projector 20.

The first projector 10, the second projector 20, the camera 30, and the information processing apparatus 40 are coupled to each other via wires. The first projector 10, the second projector 20, the camera 30, and the information processing apparatus 40 may be coupled to each other wirelessly.

The first projector 10 projects a first image A1 toward first region S1. The first image A1 is an image having uniform luminance.

The second projector 20 projects a second image A2 toward the second region S2. The second image A2 is an image having uniform luminance.

The camera 30 captures an image of a range containing the first region S1 and the second region S2 to produce a captured image in the situation in which the first image A1 is projected toward the first region S1 and the second image A2 is projected toward the second region S2.

The information processing apparatus 40 controls the first projector 10 based on the captured image. The information processing apparatus 40 may control the first projector 10 and the second projector 20 based on the captured image.

Figure 2:
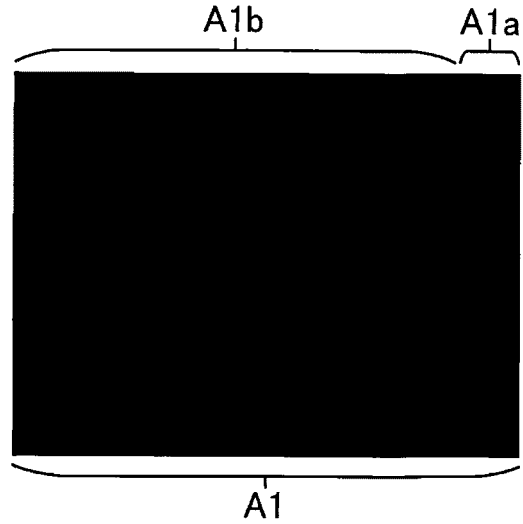
FIG. 2 shows an example of a first image.

FIG. 2 shows an example of the first image A1 projected from the first projector 10 toward the first region S1. The first image A1 is a monochromatic black image. The first image A1 is not limited to a monochromatic black image. The first image A1 may instead, for example, be a monochromatic black-gray image or a monochromatic gray image.

The first image A1 includes a first image to overlap A1$a$ and a first image not to overlap A1$b$. The first image to overlap A1$a$ is an image that overlaps with part of the second image A2 projected from the second projector 20. The first image not to overlap A1$b$ is an image that does not overlap with the second image A2 projected from the second projector 20.

Figure 3:
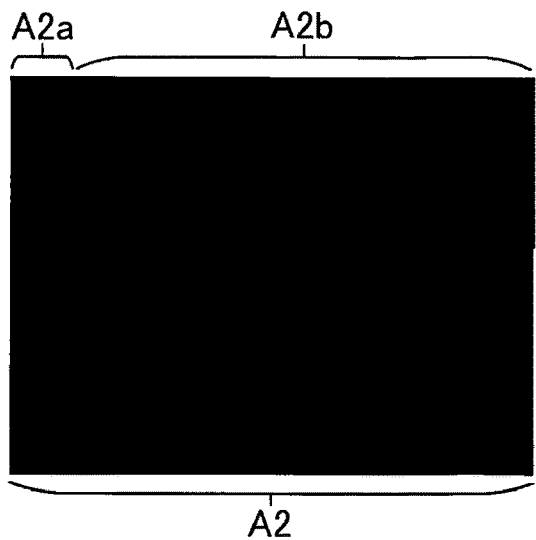
FIG. 3 shows an example of a second image.

FIG. 3 shows an example of the second image A2 projected from the second projector 20 toward the second region S2. The second image A2 is a monochromatic black image, as the first image A1 is. The second image A2 is not limited to a monochromatic black image. For example, when the first image A1 is a monochromatic black-gray image, the second image A2 may be a monochromatic black-gray image, as the first image A1 is. When the first image A1 is a monochromatic gray image, the second image A2 may be a monochromatic gray image, as the first image A1 is.

The second image A2 includes a second image to overlap A2$a$ and a second image not to overlap A2$b$. The second image to overlap A2$a$ is an image to overlap with the first image to overlap A1$a$, which is projected from the first projector 10. The second image not to overlap A2$b$ is an image that does not overlap with the first image A1.

Figure 4:
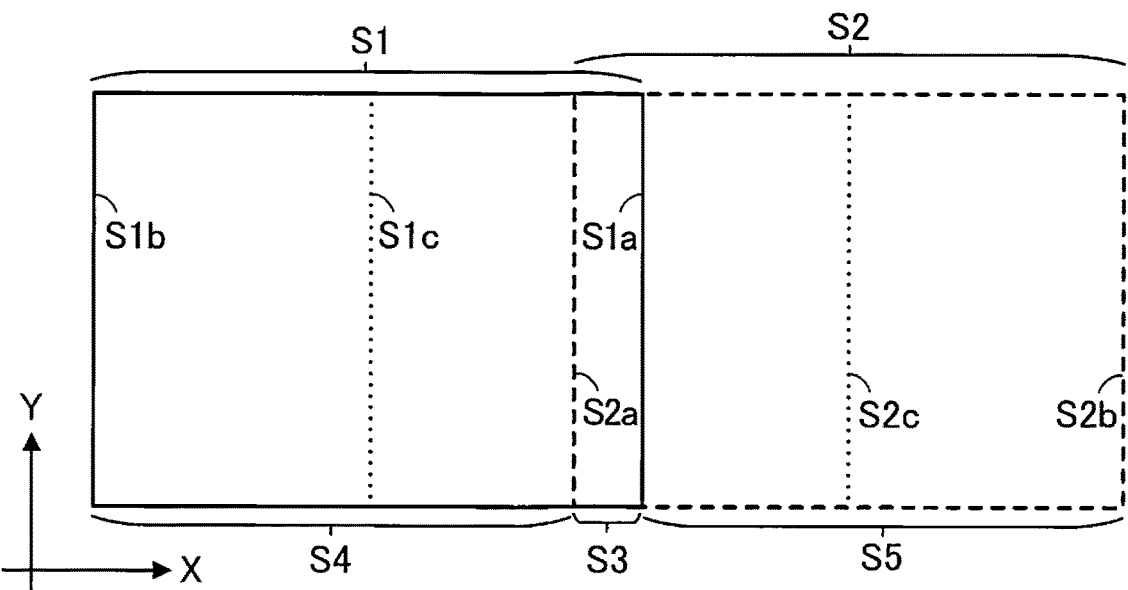
FIG. 4 is a plan view of a projection surface.

FIG. 4 is a plan view of the projection surface S having the first region S1 and the second region S2. The first region S1 is indicated by the solid line. The second region S2 is indicated by the broken line. In the plan view of the projection surface S shown in FIG. 4, the first region S1 and the second region S2 are each shown as a rectangle for convenience of the description. In the plan view of the projection surface S, the first region S1 and the second region S2 each have a shape different from a rectangle in some cases.

In the following description, axes X and Y perpendicular to each other are used. The axis X is, for example, parallel to the horizontal direction. The axis Y is, for example, parallel to the vertical direction.

The second region S2 is located at a location shifted from the first region S1 in the axis-X direction. The second region S2 may be located at a location shifted from the first region S1 in the opposite direction of the axis-X direction. In this case, the positional relationship between the first image to overlap A1$a$ and the first image not to overlap A1$b$ in the first image A1 is reversed, and the positional relationship between the second image to overlap A2$a$ and the second image not to overlap A2$b$ in the second image A2 is reversed. The position of the second region S2 in the axis-Y direction is the same as the position of the first region S1 in the axis-Y direction.

The first region S1 has an overlap region S3 and a first non-overlap region S4.

The overlap region S3 is a region where the first region S1 and the second region S2 overlap with each other. The overlap region S3 is an example of part of the first region S1. The overlap region S3 is also an example of a third region. The first image to overlap A1$a$ in the first image A1 and the second image to overlap A2$a$ in the second image A2 are projected onto the overlap region S3.

The first non-overlap region S4 is a region that is part of the first region S1 and does not overlap with the second region S2. The first non-overlap region S4 is an example of a fourth region. The first image not to overlap A1$b$ in the first image A1 is projected onto the first non-overlap region S4.

The second region S2 has the overlap region S3 and a second non-overlap region S5. The second non-overlap region S5 is a region that is part of the second region S2 and does not overlap with the first region S1. The second image not to overlap A2$b$ in the second image A2 is projected onto the second non-overlap region S5.

FIG. 4 further shows end sections S1$a$ and S1$b$ of the first region S1, a central section S1$c$ of the first region S1, end sections S2$a$ and S2$b$ of the second region S2, and a central section S2$c$ of the second region S2.

The end section S1$a$ of the first region S1 is an end section of the first region S1 in the axis-X direction. The end section S1$b$ of the first region S1 is an end section of the first region S1 in the opposite direction of the axis-X direction. The central section S1$c$ of the first region S1 is a central section of the first region S1 in the axis-X direction. The end section S2$a$ of the second region S2 is an end section of the second region S2 in the opposite direction of the axis-X direction. The end section S2$b$ of the second region S2 is an end section of the second region S2 in the axis-X direction. The central section S2$c$ of the second region S2 is a central section of the second region S2 in the axis-X direction.

A projector, such as the first projector 10 and the second projector 20, has a tendency to project a monochromatic black image containing a slight amount of light as the monochromatic black image. Furthermore, a projector, such as the first projector 10 and the second projector 20, has a tendency to project an image containing a slight amount of light as the monochromatic black image, the monochromatic black-gray image, and the monochromatic gray image.

The first projector 10 projects the first image A1, which is a monochromatic black image, toward the first region S1. The second projector 20 projects the second image A2, which is a monochromatic black image, toward the second region S2. The overlap region S3 is therefore irradiated with both the light contained in the first image A1 and the light contained in the second image A2. The first non-overlap region S4 is not irradiated with the light contained in the second image A2 but irradiated with the light contained in the first image A1. The second non-overlap region S5 is not irradiated with the light contained in the first image A1 but irradiated with the light contained in the second image A2.

Figure 5:
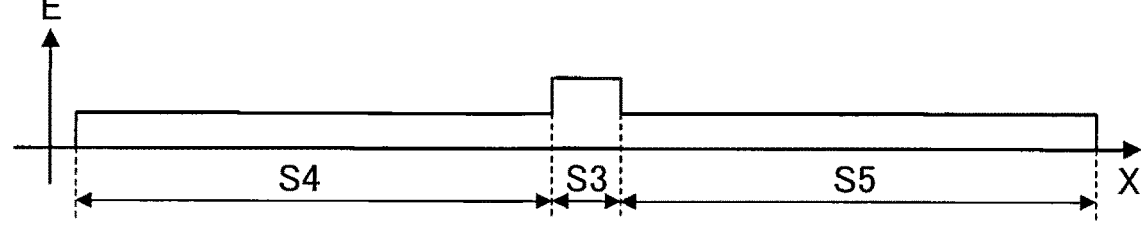
FIG. 5 shows an example of the illuminance at the projection surface.

FIG. 5 shows an example of illuminance E at the projection surface S. In FIG. 5, the projection surface S is a planar surface. When the projection surface S is a planar surface, the illuminance at the overlap region S3 is higher than the illuminance at the first non-overlap region S4. The first non-overlap region S4 is therefore undesirably darker than the overlap region S3.

Figure 6:
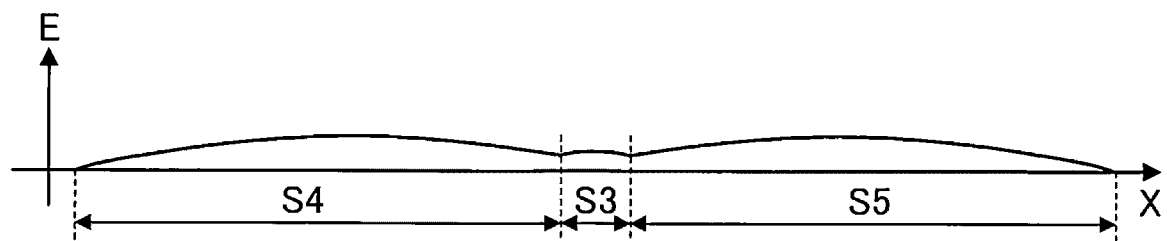
FIG. 6 shows another example of the illuminance at the projection surface.

FIG. 6 shows another example of the illuminance E at the projection surface S. In FIG. 6, the projection surface S is the convex curved surface shown in FIG. 1.

When the second image A2 is not projected but the first image A1 is projected toward the first region S1, which is a convex curved surface, the end sections S1$a$ and S1$b$ of the first region S1 are darker than the central section S1$c$ of the first region S1. The greater the curvature of the first region S1, the darker the end sections S1$a$ and S1$b$ of the first region S1 than the central section S1$c$ of the first region S1.

When the first image A1 is not projected but the second image A2 is projected toward the second region S2, which is a convex curved surface, the end sections S2$a$ and S2$b$ of the second region S2 are darker than the central section S2$c$ of the second region S2. The greater the curvature of the second region S2, the darker the end sections S2$a$ and S2$b$ of the second region S2 than the central section S2$c$ of the second region S2.

Therefore, depending on the shape of the projection surface S, the first non-overlap region S4 is undesirably brighter than the overlap region S3, as shown in FIG. 6, which is opposite from the case shown in FIG. 5.

In the example shown in FIG. 6, the illuminance is zero at the end section S1$b$ of the first region S1 and the end section S2$b$ of the second region S2.

Figure 7:
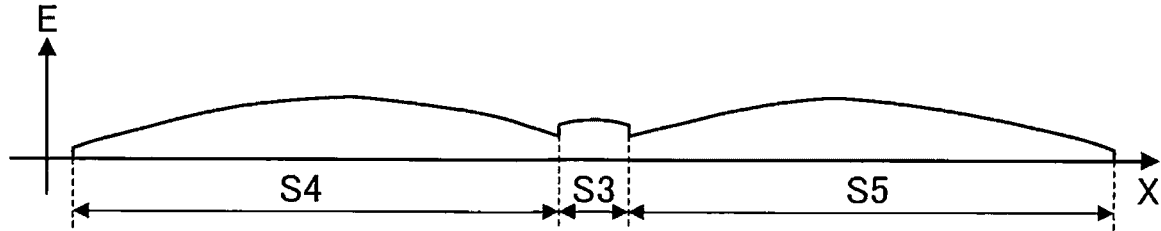
FIG. 7 shows still another example of the illuminance at the projection surface.

FIG. 7 shows another example of the illuminance at the projection surface S. In FIG. 7, the projection surface S is a convex curved surface having curvature different from the curvature of the convex curved surface shown in FIG. 1. In the example shown in FIG. 7, the illuminance is higher than zero at the end sections S1$a$ and S1$b$ of the first region S1 and the end sections S2$a$ and S2$b$ of the second region S2.

Also in the example shown in FIG. 7, the first non-overlap region S4 is undesirably brighter than the overlap region S3.

In the example shown in FIG. 7, since the illuminance is higher than zero at the end sections S1$a$ and S1$b$ of the first region S1 and the end sections S2$a$ and S2$b$ of the second region S2, an illuminance step occurs at the boundary between the first non-overlap region S4 and the overlap region S3 and the boundary between the overlap region S3 and the second non-overlap region S5.

The captured image produced by the camera 30 shown in FIG. 1 shows the brightness at the overlap region S3 and the brightness at the first non-overlap region S4. The information processing apparatus 40 acquires the captured image. The information processing apparatus 40 identifies the brightness at the overlap region S3 and the brightness at the first non-overlap region S4 based on the captured image.

When the first non-overlap region S4 is darker than the overlap region S3 as shown in FIG. 5, the information processing apparatus 40 controls the first projector 10 to adjust the first image A1.

As an example, when the first non-overlap region S4 is darker than the overlap region S3, the information processing apparatus 40 performs first correction. The first correction is correction that adjusts the first image A1 to increase the highest brightness at the first non-overlap region S4. The first correction is, for example, correction that maintains the luminance of the first image to overlap A1$a$ contained in the first image A1 and increases the luminance of the first image not to overlap A1$b$ contained in the first image A1.

Figure 8:
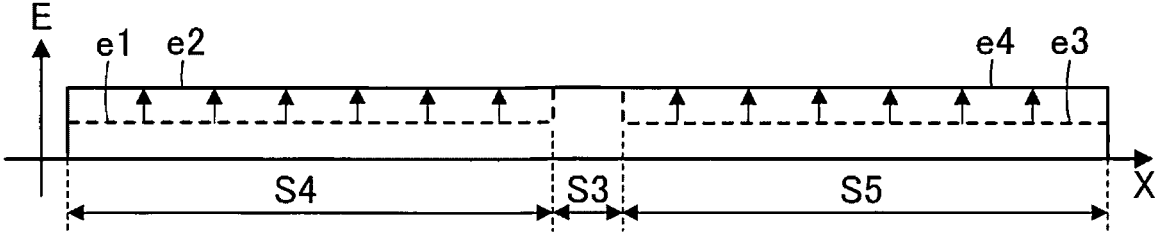
FIG. 8 describes an example of first correction.

FIG. 8 describes an example of the first correction. In FIG. 8, in addition to the brightness at the first non-overlap region S4, the brightness at the second non-overlap region S5 is corrected, as the brightness at the first non-overlap region S4 is.

In FIG. 8, illuminance e2 at the first non-overlap region S4 after the first correction is higher than illuminance e1 at the first non-overlap region S4 before the first correction. Similarly, illuminance e4 at the second non-overlap region S5 after the first correction is higher than illuminance e3 at the second non-overlap region S5 before the first correction.

On the other hand, when the first non-overlap region S4 is brighter than the overlap region S3, as shown in FIGS. 6 and 7, the information processing apparatus 40 does not perform the first correction.

For example, when the first non-overlap region S4 is brighter than the overlap region S3, the information processing apparatus 40 does not perform the correction that adjusts the first image A1 but maintains the first image A1.

A2: First Projector 10

Figure 9:
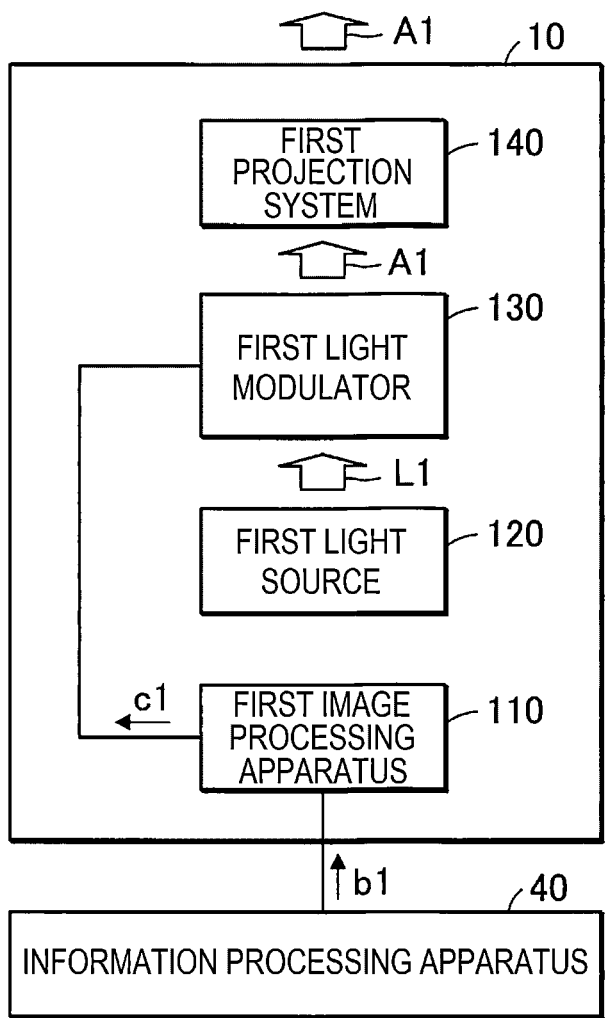
FIG. 9 shows an example of a first projector.

FIG. 9 shows an example of the first projector 10. The first projector 10 includes a first image processing apparatus 110, a first light source 120, a first light modulator 130, and a first projection system 140.

The first image processing apparatus 110 is formed, for example, of a circuit, such as an image processing circuit. The first image processing apparatus 110 receives image data b1 from an information processing apparatus 40. The first image processing apparatus 110 produces an image signal c1 by performing image processing, such as gamma correction, on the image data b1. The image signal c1 is a signal based on the image data b1. For example, when the image data b1 represents a monochromatic black image, the image signal c1 also represents the monochromatic black image.

The first light source 120 is an LED (light emitting diode). The first light source 120 is not limited to an LED and may, for example, be a xenon lamp or a laser light source. The first light source 120 outputs light L1 toward the first light modulator 130.

The first light modulator 130 produces an image by modulating the light L1 based on the image signal c1. The first light modulator 130 includes, for example, a liquid crystal light valve. The first light modulator 130 changes the light transmittance of the liquid crystal light valve based on the image signal c1. The first light modulator 130 produces an image by modulating the light L1 with the liquid crystal light valve having the changed light transmittance. The first projector 10 may include a DMD (digital micromirror device) in place of the first light modulator 130.

When the image signal c1 represents a monochromatic black image, part of the light L1 undesirably passes through the first light modulator 130. Therefore, when the image signal c1 represents a monochromatic black image, the first light modulator 130 produces a monochromatic black image containing a slight amount of light. That is, when the image signal c1 represents a monochromatic black image, the first light modulator 130 produces the first image A1, which is a monochromatic black image containing a slight amount of light.

A light modulation element that modulates the light L1 in the first light modulator 130 is not limited to a liquid crystal light valve and can be changed as appropriate. When the image signal c1 represents a monochromatic black image and the light modulation element is configured to transmit part of the light L1, as in the case of a liquid crystal light valve, it is particularly effective not to perform the first correction.

The first projection system 140 includes one or more lenses. When the image signal c1 represents a monochromatic black image, the first projection system 140 projects the first image A1 toward the first region S1.

A3: Second Projector 20

Figure 10:
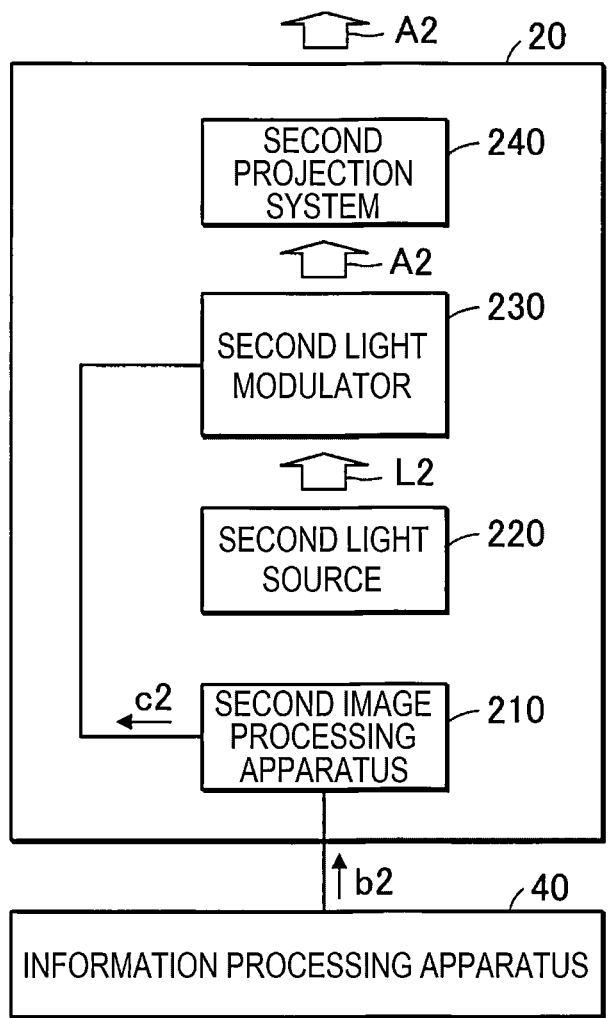
FIG. 10 shows an example of a second projector.

FIG. 10 shows an example of the second projector 20. The second projector 20 includes a second image processing apparatus 210, a second light source 220, a second light modulator 230, and a second projection system 240.

The second image processing apparatus 210 is formed, for example, of a circuit, such as an image processing circuit. The second image processing apparatus 210 receives image data b2 from the information processing apparatus 40. The second image processing apparatus 210 produces an image signal c2 by performing image processing, such as gamma correction, on the image data b2. The image signal c2 is a signal based on the image data b2. For example, when the image data b2 represents a monochromatic black image, the image signal c2 also represents the monochromatic black image.

The second light source 220 is an LED. The second light source 220 is not limited to an LED and may, for example, be a xenon lamp or a laser light source. The second light source 220 outputs light L2 toward the second light modulator 230.

The second light modulator 230 produces an image by modulating the light L2 based on the image signal c2. The second light modulator 230 includes, for example, a liquid crystal light valve. The second light modulator 230 changes the light transmittance of the liquid crystal light valve based on the image signal c2. The second light modulator 230 produces an image by modulating the light L2 with the liquid crystal light valve having the changed light transmittance. The second projector 20 may include a DMD in place of the second light modulator 230.

When the image signal c2 represents a monochromatic black image, part of the light L2 undesirably passes through the second light modulator 230. Therefore, when the image signal c2 represents a monochromatic black image, the second light modulator 230 produces a monochromatic black image containing a slight amount of light. That is, when the image signal c2 represents a monochromatic black image, the second light modulator 230 produces the second image A2, which is a monochromatic black image containing a slight amount of light.

A light modulation element that modulates the light L2 in the second light modulator 230 is not limited to a liquid crystal light valve and can be changed as appropriate. When the image signal c2 represents a monochromatic black image and the light modulation element is configured to transmit part of the light L2, as in the case of a liquid crystal light valve, it is particularly effective not to perform second correction, which will be described later.

The second projection system 240 includes one or more lenses. When the image signal c2 represents a monochromatic black image, the second projection system 240 projects the second image A2 toward the second region S2.

A4: Camera 30

Figure 11:
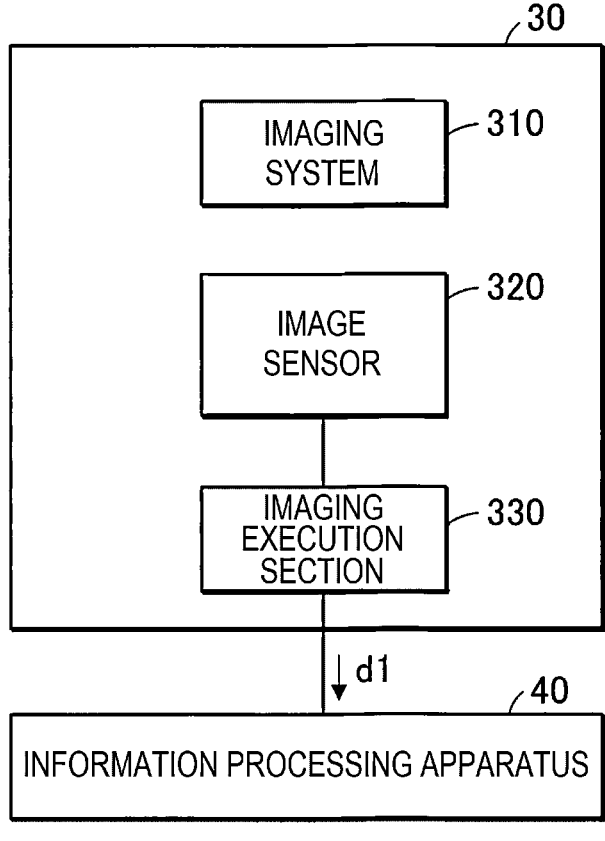
FIG. 11 shows an example of a camera.

FIG. 11 shows an example of the camera 30. The camera 30 includes an imaging system 310, an image sensor 320, and an imaging execution section 330.

The imaging system 310 includes one or more lenses. The imaging system 310 forms an optical image of the range containing the first region S1 and the second region S2 at the image sensor 320.

The image sensor 320 is a CCD (charge coupled device) image sensor. The image sensor 320 is not limited to a CCD image sensor. The image sensor 320 may instead, for example, be a CMOS (complementary metal oxide semiconductor) image sensor. The image sensor 320 produces captured image data d1 based on the optical image formed by the imaging system 310 in the situation in which the first image A1 is projected toward the first region S1 and the second image A2 is projected toward the second region S2. The captured image data d1 represents the captured image. The captured image represents the first region S1 and the second region S2. The fact that the camera 30 produces the captured image data d1 means that the camera 30 produces the captured image.

The imaging execution section 330 controls the image sensor 320 to control the image capture. The imaging execution section 330 provides the information processing apparatus 40 with the captured image data d1 produced by the image sensor 320. The imaging execution section 330 includes one or more CPUs (central processing units).

A5: Information Processing Apparatus 40

Figure 12:
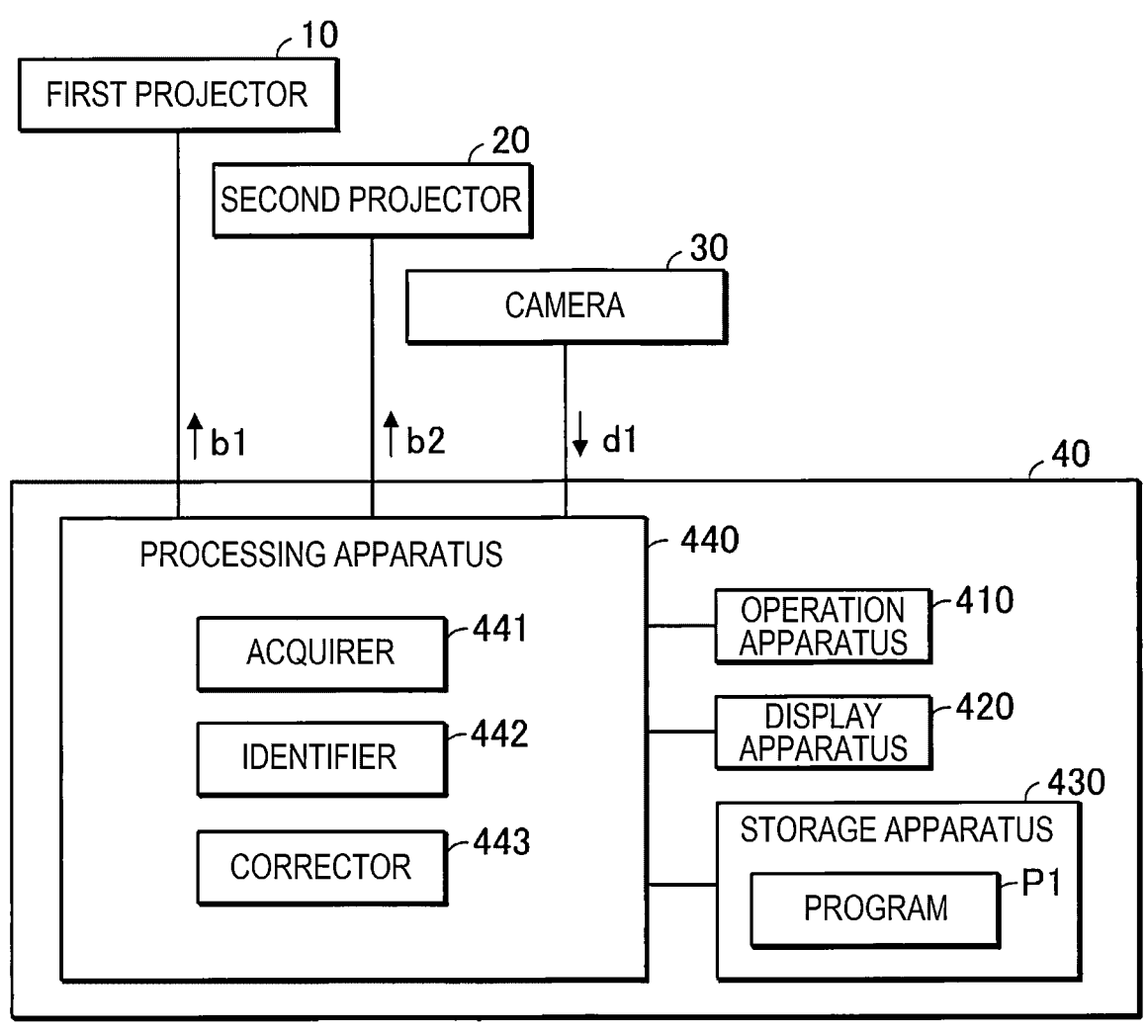
FIG. 12 shows an example of an information processing apparatus.

FIG. 12 shows an example of the information processing apparatus 40. The information processing apparatus 40 is a personal computer (PC). The information processing apparatus 40 is not limited to a PC. The information processing apparatus 40 may, for example, be a tablet computer, a smartphone, or a dedicated processing apparatus. The PC, the tablet computer, and the smartphone are each an example of a general-purpose processing apparatus. The information processing apparatus 40 is an example of a processing apparatus.

The information processing apparatus 40 includes an operation apparatus 410, a display apparatus 420, a storage apparatus 430, and a processing apparatus 440.

The operation apparatus 410 includes, for example, a keyboard, a mouse, operation buttons, operation keys, or a touch panel. The operation apparatus 410 receives a user's input operation.

The display apparatus 420 includes a display. The display is, for example, a liquid crystal display, a plasma display, an organic EL (electro-luminescence) display, or any other FPD (flat panel display). The display apparatus 420 displays a variety of pieces of information. The display apparatus 420 may be omitted.

The storage apparatus 430 is a computer readable recording medium. The storage apparatus 430 includes, for example, a nonvolatile memory and a volatile memory. The nonvolatile memory is, for example, a ROM (read only memory), an EPROM (erasable programmable read only memory), and an EEPROM (electrically erasable programmable read only memory). The volatile memory is, for example, a RAM (random access memory).

The storage apparatus 430 stores a program P1. The program P1 specifies the action of the processing apparatus 440. The storage apparatus 430 may store the program P1 read from a storage apparatus in a server that is not shown. In this case, the storage apparatus in the server is an example of the computer readable recording medium.

The processing apparatus 440 includes one or more CPUs. The one or more CPUs are an example of one or more processors. The processing apparatus 440, the processor, the CPU, and the information processing apparatus 40 are each an example of the computer. The processing apparatus 440 is another example of the processing apparatus.

The processing apparatus 440 reads the program P1 from the storage apparatus 430. The processing apparatus 440 functions as an acquirer 441, an identifier 442, and a corrector 443 by executing the program P1.

At least one of the acquirer 441, the identifier 442, and the corrector 443 may be formed of a DSP (digital signal processor), an ASIC (application specific integrated circuit), or any other circuit. At least one of the acquirer 441, the identifier 442, and the corrector 443 means "the acquirer 441", "the identifier 442", and "the corrector 443", "the acquirer 441 and the identifier 442", "the acquirer 441 and the corrector 443", "the identifier 442 and the corrector 443", or the acquirer 441, the identifier 442, and the corrector 443".

The acquirer 441 acquires the captured image. For example, the acquirer 441 acquires the captured image by acquiring the captured image data d1. The acquirer 441 acquires the captured image data d1 directly from the camera 30. The acquirer 441 may instead acquire the captured image data d1 indirectly from the camera 30. For example, when the camera 30 is incorporated in the first projector 10, the acquirer 441 may acquire the captured image data d1 from the camera 30 via the first projector 10.

The identifier 442 identifies the brightness at the overlap region S3 and the brightness at the first non-overlap region S4 based on the captured image indicated by the captured image data d1.

The brightness at the overlap region S3 is the average luminance at the overlap region S3. The brightness at the overlap region S3 is not limited to the average luminance at the overlap region S3. The brightness at the overlap region S3 may, for example, be the highest luminance at the overlap region S3.

The brightness at the first non-overlap region S4 is the average luminance at the first non-overlap region S4. The brightness at the first non-overlap region S4 is not limited to the average luminance at the first non-overlap region S4. For example, when the brightness at the overlap region S3 is the highest luminance at the overlap region S3, the brightness at the first non-overlap region S4 may be the highest luminance at the first non-overlap region S4.

The identifier 442 may further identify the brightness at the second non-overlap region S5 based on the captured image indicated by the captured image data d1.

The brightness at the second non-overlap region S5 is the average luminance at the second non-overlap region S5. The brightness at the second non-overlap region S5 is not limited to the average luminance at the second non-overlap region S5. For example, when the brightness at the overlap region S3 is the highest luminance at the overlap region S3, the brightness at the second non-overlap region S5 may be the highest luminance at the second non-overlap region S5.

The corrector 443 controls the first projector 10 based on the captured image. The corrector 443 may control the first projector 10 and the second projector 20 based on the captured image.

When the first non-overlap region S4 is darker than the overlap region S3, the corrector 443 performs the correction that adjusts the first image A1, as shown in FIG. 5.

For example, when the first non-overlap region S4 is darker than the overlap region S3, the corrector 443 performs the first correction. The first correction is correction that adjusts the first image A1 to increase the highest brightness at the first non-overlap region S4, as described above.

The highest brightness at the first non-overlap region S4 is, for example, the highest luminance at the first non-overlap region S4.

The corrector 443 adjusts the first image A1 by adjusting the image data b1. The corrector 443 therefore performs the first correction by adjusting the image data b1.

In the following description, adjusting the first image A1 means adjusting the first image A1 by adjusting the image data b1.

On the other hand, when the first non-overlap region S4 is brighter than the overlap region S3, as shown in FIG. 6 or 7, the corrector 443 does not perform the first correction. That is, when the first non-overlap region S4 is brighter than the overlap region S3, the corrector 443 does not perform the correction that adjusts the first image A1 to increase the highest brightness at the first non-overlap region S4.

For example, when the first non-overlap region S4 is brighter than the overlap region S3, the corrector 443 does not perform the correction that adjusts the image data b1 but maintains the first image A1.

When the second non-overlap region S5 is darker than the overlap region S3, as shown in FIG. 5, the corrector 443 may perform correction that adjusts the second image A2.

For example, when the second non-overlap region S5 is darker than the overlap region S3, the corrector 443 performs second correction. The second correction is correction that adjusts the second image A2 to increase the highest brightness at the second non-overlap region S5.

The corrector 443 adjusts the second image A2 by adjusting the image data b2. The corrector 443 therefore performs the second correction by adjusting the image data b2.

In the following description, adjusting the second image A2 means adjusting the second image A2 by adjusting the image data b2.

On the other hand, when the second non-overlap region S5 is brighter than the overlap region S3, as shown in FIG. 6 or 7, the corrector 443 does not perform the second correction. That is, when the second non-overlap region S5 is brighter than the overlap region S3, the corrector 443 does not perform the correction that adjusts the second image A2 to increase the highest brightness at the second non-overlap region S5.

For example, when the second non-overlap region S5 is brighter than the overlap region S3, the corrector 443 does not adjust the image data b2 but maintains the second image A2.

A6: Description of Action

Figure 13:
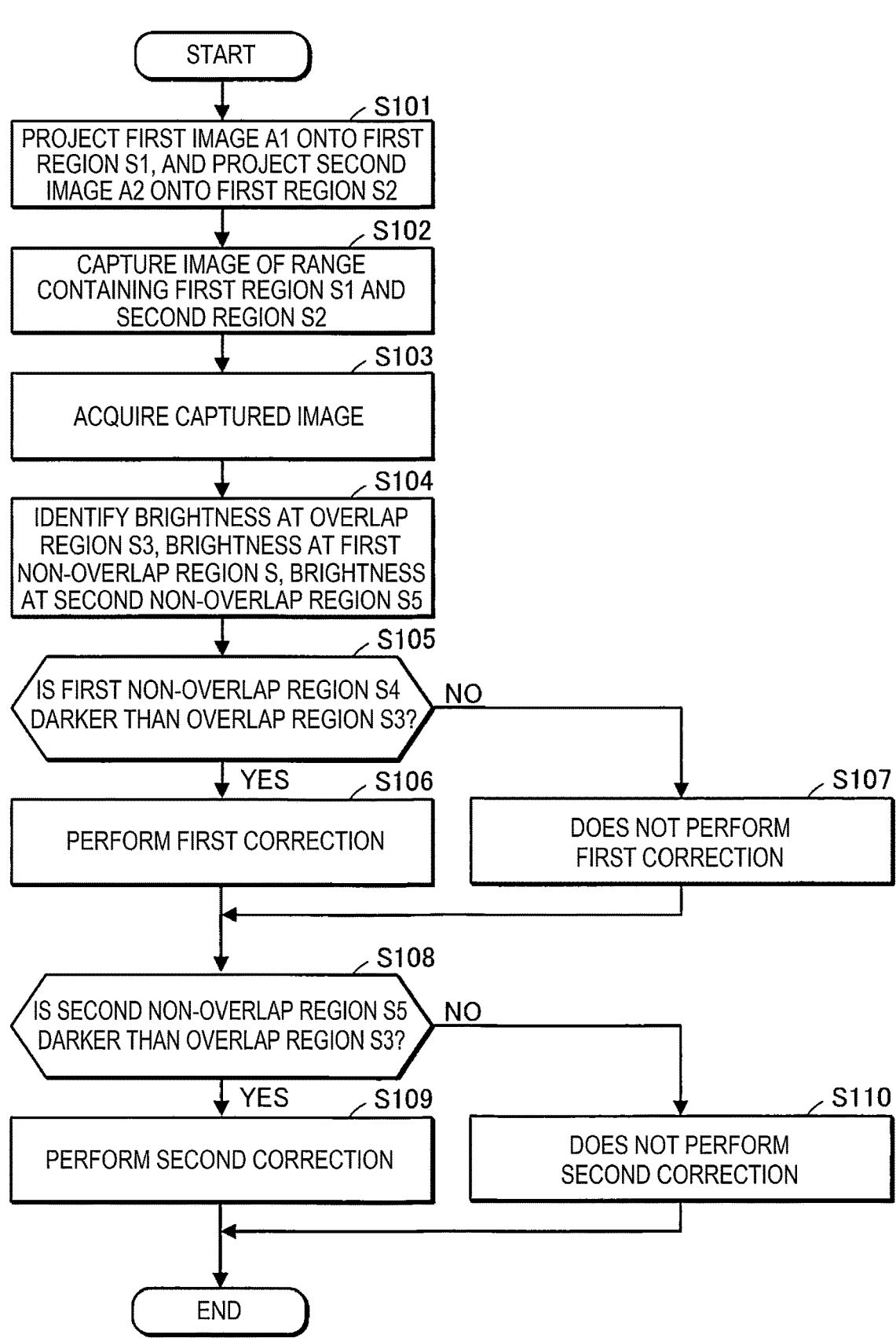
FIG. 13 describes the action of the projection system.

FIG. 13 describes the action of the projection system 1.

In step S101, the first projector 10 projects the first image A1 toward the first region S1, and the second projector 20 projects the second image A2 toward the second region S2.

In step S101, when the operation apparatus 410 of the information processing apparatus 40 first accepts an action instruction from the user, the operation apparatus 410 provides the processing apparatus 440 with the action instruction. The corrector 443 of the processing apparatus 440 provides the first projector 10 with the image data b1 representing a monochromatic black image and provides the second projector 20 with the image data b2 representing a monochromatic black image in response to the action instruction. The first projector 10 projects the first image A1 toward the first region S1 based on the image data b1 representing a monochromatic black image. The second projector 20 projects the second image A2 toward the second region S2 based on the image data b2 representing a monochromatic black image.

Subsequently, in step S102, the camera 30 captures an image of the range containing the first region S1 and the second region S2 in the situation in which the first image A1 is projected toward the first region S1 and the second image A2 is projected toward the second region S2.

In step S102, the corrector 443 provides the camera 30 with an imaging instruction in the situation in which the first image A1 is projected toward the first region S1 in accordance with the provided image data b1 and the second image A2 is projected toward the second region S2 in accordance with the provided image data b2. The camera 30 produces the captured image data d1 by capturing an image of the range containing the first region S1 and the second region S2 in response to the imaging instruction. The camera 30 provides the information processing apparatus 40 with the captured image data d1. The captured image data d1 represents the captured image, as described above.

Subsequently, in step S103, the acquirer 441 acquires the captured image. In step S103, the acquirer 441 acquires the captured image by acquiring the captured image data d1 from the camera 30.

Subsequently, in step S104, the identifier 442 identifies the brightness at the overlap region S3, the brightness at the first non-overlap region S4, and the brightness at the second non-overlap region S5 based on the captured image.

In step S104, the identifier 442 identifies the average luminance at the overlap region S3 as the brightness at the overlap region S3 based on the captured image. The identifier 442 identifies the average luminance at the first non-overlap region S4 as the brightness at the first non-overlap region S4 based on the captured image. The identifier 442 identifies the average luminance at the second non-overlap region S5 as the brightness at the second non-overlap region S5 based on the captured image.

Note that the position of the overlap region S3 in the captured image, the position of the first non-overlap region S4 in the captured image, and the position of the second non-overlap region S5 in the captured image are identified in advance.

For example, the camera 30 first captures an image of the range containing the first region S1 and the second region S2 to produce first captured image data in a situation in which the first projector 10 projects a monochromatic white image onto the first region S1 but the second projector 20 does not project an image. The first captured image data represents a first captured image.

The camera 30 subsequently captures an image of the range containing the first region S1 and the second region S2 to produce second captured image data in a situation in which the first projector 10 does not project an image but the second projector 20 projects a monochromatic white image onto the second region S2. The second captured image data represents a second captured image.

Subsequently, the acquirer 441 acquires the first captured image data and the second captured image data to acquire the first captured image and the second captured image.

The identifier 442 superimposes the first and second captured images on each other, locates the position of the region where the white image is present in the second captured image out of the region where the white image is present in the first captured image, and identifies the located position as the position of the overlap region S3 in the captured image. The identifier 442 locates the position of the region different from the overlap region S3 in the captured image out of the region where the white image is present in the first captured image, and identifies the located position as the position of the first non-overlap region S4 in the captured image. The identifier 442 locates the position of the region different from the overlap region S3 in the captured image out of the region where the white image is present in the second captured image, and identifies the located position as the position of the second non-overlap region S5 in the captured image.

The approach of identifying the position of the overlap region S3 in the captured image, the position of the first non-overlap region S4 in the captured image, and the position of the second non-overlap region S5 in the captured image is not limited to the approach described above. For example, the monochromatic white image may be replaced with a monochromatic yellow image or a monochromatic red image.

The identifier 442 may instead identify the position of the overlap region S3 in the captured image, the position of the first non-overlap region S4 in the captured image, and the position of the second non-overlap region S5 in the captured image by using a first projective transformation matrix and a second projective transformation matrix. The first projective transformation matrix is a projective transformation matrix representing the correspondence between the positions of a point on the first image A1 and the position of the point on the captured image. The second projective transformation matrix is a projective transformation matrix representing the correspondence between the position of a point on the second image A2 and the position of the point on the captured image. In this case, the identifier 442 identifies the position of the overlap region S3 in the captured image by using the position of the first image to overlap A1*a* in the first image A1 and the first projective transformation matrix. The identifier 442 may identify the position of the overlap region S3 in the captured image by using the position of the second image to overlap A2*a* in the second image A2 and the second projective transformation matrix. The identifier 442 identifies the position of the first non-overlap region S4 in the captured image by using the position of the first image no to overlap A1*b* in the first image A1 and the first projective transformation matrix. The identifier 442 identifies the position of the second non-overlap region S5 in the captured image by using the position of the second image not to overlap A2*b* in the second image A2 and the second projective transformation matrix.

Subsequently, in step S105, the corrector 443 evaluates whether the first non-overlap region S4 is darker than the overlap region S3.

When the corrector 443 determines in step S105 that the first non-overlap region S4 is darker than the overlap region S3 (YES in step S105), the corrector 443 proceeds to the process in step S106.

In step S106, the corrector 443 performs the first correction. The first correction is correction that adjusts the first image A1 to increase the highest brightness at the first non-overlap region S4. The first correction adjusts the first image A1 in such a way that the brightness at the first non-overlap region S4 approaches the brightness at the overlap region S3.

The corrector 443 performs the first correction as shown in FIG. 8 by adjusting the image data b1 in such a way that the luminance of the first image not to overlap A1*b* shown in FIG. 2 uniformly increases by a first adjustment value.

The first adjustment value is, for example, a fixed value set in advance. The first adjustment value is not limited to a fixed value set in advance. The first adjustment value may, for example, be a value based on the difference in brightness between the overlap region S3 and the first non-overlap region S4. For example, the corrector 443 sets the first adjustment value as follows: the greater the difference in brightness between the overlap region S3 and the first non-overlap region S4, the greater the first adjustment value; and the smaller the difference in brightness between the overlap region S3 and the first non-overlap region S4, the smaller the first adjustment value.

On the other hand, when the corrector 443 determines in step S105 that the first non-overlap region S4 is not darker than the overlap region S3 (NO in step S105), the corrector 443 proceeds to the process in step S107. For example, when the corrector 443 determines that the first non-overlap region S4 is brighter than the overlap region S3, the corrector 443 proceeds to the process in step S107. When the corrector 443 determines that the first non-overlap region S4 is equal in terms of brightness to the overlap region S3, the corrector 443 proceeds to the process in step S107.

In step S107, the corrector 443 does not perform the first correction. For example, the corrector 443 does not perform the correction that adjusts the image data b1 but maintains the first image A1.

Subsequent to step S106 or S107, in step S108, the corrector 443 evaluates whether the second non-overlap region S5 is darker than the overlap region S3.

When the corrector 443 determines in step S108 that the second non-overlap region S5 is darker than the overlap region S3 (YES in step S108), the corrector 443 proceeds to the process in step S109.

In step S109, the corrector 443 performs the second correction. The second correction is correction that adjusts the second image A2 to increase the highest brightness at the second non-overlap region S5. The second correction adjusts the second image A2 in such a way that the brightness at the second non-overlap region S5 approaches the brightness at the overlap region S3.

The corrector 443 performs the second correction as shown in FIG. 8 by adjusting the image data b2 in such a way that the luminance at the second image not to overlap A2*b* shown in FIG. 3 uniformly increases by a second adjustment value.

The second adjustment value is, for example, a fixed value set in advance. The second adjustment value is not limited to a fixed value set in advance. The second adjustment value may, for example, be a value based on the difference in brightness between the overlap region S3 and the second non-overlap region S5. For example, the corrector 443 sets the second adjustment value as follows: the greater the difference in brightness between the overlap region S3 and the second non-overlap region S5, the greater the second adjustment value; and the smaller the difference in brightness between the overlap region S3 and the second non-overlap region S5, the smaller the second adjustment value.

On the other hand, when the corrector 443 determines in step S108 that the second non-overlap region S5 is not darker than the overlap region S3 (NO in step S108), the corrector 443 proceeds to the process in step S110. For example, when the corrector 443 determines that the second non-overlap region S5 is brighter than the overlap region S3, the corrector 443 proceeds to the process in step S110. When the corrector 443 determines that the second non-overlap region S5 is equal in terms of brightness to the overlap region S3, the corrector 443 proceeds to the process in step S110.

In step S110, the corrector 443 does not perform the second correction. For example, the corrector 443 does not adjust the image data b2 but maintains the second image A2.

Steps S108 to S110 may be executed before step S105. Steps S108 to S110 may be omitted.

A7: Summary of First Embodiment

The first embodiment includes the aspects below.

A projection image adjustment method according to the first embodiment includes acquiring a captured image produced by capturing an image of a range containing the first region S1 and the second region S2 in the situation in which the first projector 10 projects the first image A1 having uniform luminance toward the first region S1 of the projection surface S and the second projector 20 projects the second image A2 having uniform luminance toward the second region S2, which is part of the projection surface S and has a portion that overlaps with part of the first region S1, identifying based on the captured image the brightness at the overlap region S3, where the first region S1 and the second region S2 overlap with each other, and the brightness at the first non-overlap region S4, which is part of the first region S1 and does not overlap with the second region S2, performing correction that adjusts the first image A1 when the first non-overlap region S4 is darker than the overlap region S3, and not performing correction that increases the highest brightness at the first non-overlap region S4 by adjusting the first image A1 when the first non-overlap region S4 is brighter than the overlap region S3.

The projection system 1 includes the first projector 10, which projects the first image A1 having uniform luminance toward the first region S1 of the projection surface S, the second projector 20, which projects the second image A2 having uniform luminance toward the second region S2, which is part of the projection surface S and has a portion that overlaps with part of the first region S1, the camera 30, which produces a captured image by capturing an image of a range containing the first region S1 and the second region S2 in the situation in which the first image A1 is projected toward the first region S1 and the second image A2 is projected toward the second region S2, and the information processing apparatus 40, and the information processing apparatus 40 performs acquisition of the captured image, identification, based on the captured image, of the brightness at the overlap region S3, where the first region S1 and the second region S2 overlap with each other, and the brightness at the first non-overlap region S4, which is part of the first region S1 and does not overlap with the second region S2, and adjustment of the first image A1 when the first non-overlap region S4 is darker than the overlap region S3, and does not perform correction that increases the highest brightness at the first non-overlap region S4 by adjusting the first image A1 when the first non-overlap region S4 is brighter than the overlap region S3.

The information processing apparatus 40 performs acquisition of a captured image produced by capturing an image of a range containing the first region S1 and the second region S2 in the situation in which the first projector 10 projects the first image A1 having uniform luminance toward the first region S1 of the projection surface S and the second projector 20 projects the second image A2 having uniform luminance toward the second region S2, which is part of the projection surface S and has a portion that overlaps with part of the first region S1, identification, based on the captured image, of the brightness at the overlap region S3, where the first region S1 and the second region S2 overlap with each other, and the brightness at the first non-overlap region S4, which is part of the first region S1 and does not overlap with the second region S2, and adjustment of the first image A1 when the first non-overlap region S4 is darker than the overlap region S3, and does not perform correction that increases the highest brightness at the first non-overlap region S4 by adjusting the first image A1 when the first non-overlap region S4 is brighter than the overlap region S3.

The program P1 causes the processing apparatus 440 to acquire a captured image produced by capturing an image of a range containing the first region S1 and the second region S2 in the situation in which the first projector 10 projects the first image A1 having uniform luminance toward the first region S1 of the projection surface S and the second projector 20 projects the second image A2 having uniform luminance toward the second region S2, which is part of the projection surface S and has a portion that overlaps with part of the first region S1, identify, based on the captured image, the brightness at the overlap region S3, where the first region S1 and the second region S2 overlap with each other, and the brightness at the first non-overlap region S4, which is part of the first region S1 and does not overlap with the second region S2, and adjust the first image A1 when the first non-overlap region S4 is darker than the overlap region S3, and does not cause the processing apparatus 440 to perform correction that increases the highest brightness at the first non-overlap region S4 by adjusting the first image A1 when the first non-overlap region S4 is brighter than the overlap region S3.

For example, when the first non-overlap region S4 is brighter than the overlap region S3, and correction that adjusts the first image A1 to increase the highest brightness at the first non-overlap region S4 is performed, the difference between the brightness at the first non-overlap region S4 and the brightness at the overlap region S3 undesirably increases. When the difference increases, the difference undesirably becomes more noticeable.

In contrast, according to the aspect described above, when the first non-overlap region S4 is brighter than the overlap region S3, the correction that adjusts the first image A1 to increase the highest brightness at the first non-overlapping region S4 is not performed. The correction that causes the difference in brightness between the first non-overlap region S4 and the overlap region S3 to be noticeable can be suppressed when the first non-overlap region S4 is brighter than the overlap region S3.

In the projection image adjustment method according to the first embodiment, not performing correction that adjusts the first image A1 to increase the highest brightness at the first non-overlap region S4 includes not performing the correction that adjusts the first image A1.

Applying the approach disclosed in JP-A-2014-137386 when the first non-overlap region S4 is brighter than the overlap region S3 undesirably further increases the difference in brightness between the first non-overlap region S4 and the overlap region S3.

According to the aspect described above, when the first non-overlap region S4 is brighter than the overlap region S3, the correction that adjusts the first image A1 is not performed. Any further increase in the difference in brightness between the first non-overlap region S4 and the overlap region S3 can therefore be avoided.

According to the aspect described above, the load required for the adjustment of the first image A1 can be reduced as compared with the load required in the configuration in which the first image A1 is adjusted when the first non-overlap region S4 is brighter than the overlap region S3.

In the projection image adjustment method according to the first embodiment, the brightness at the overlap region S3 is the average luminance at the overlap region S3, the brightness at the first non-overlap region S4 is the average luminance at the first non-overlap region S4, and the highest brightness at the first non-overlap region S4 is the highest luminance at the first non-overlap region S4.

According to the aspect described above, the adjustment of the first image A1 can be controlled based on the relationship in terms of the magnitude of the average luminance between the overlap region S3 and the first non-overlap region S4. Therefore, for example, even when the luminance at part of the overlap region S3 has a wrong value resulting from sudden noise, using the average luminance at the overlap region S3 can lower the effect of the wrong value on the adjustment of the first image A1.

In the projection image adjustment method according to the first embodiment, the brightness at the overlap region S3 is the highest luminance at the overlap region S3, the brightness at the first non-overlap region S4 is the highest luminance at the first non-overlap region S4, and the highest brightness at the first non-overlap region S4 is the highest luminance at the first non-overlap region S4.

According to the aspect described above, the adjustment of the first image A1 can be controlled based on the relationship in terms of magnitude between the highest luminance at the overlap region S3 and the highest luminance at the first non-overlap region S4. Therefore, for example, the process of identifying the average luminance at the overlap region S3 and the average luminance at the first non-overlap region S4 can be omitted.

In the projection image adjustment method according to the first embodiment, adjusting the first image A1 when the first non-overlap region S4 is darker than the overlap region S3 includes performing correction that adjusts the first image A1 to increase the highest brightness at the first non-overlap region S4 when the first non-overlap region S4 is darker than the overlap region S3.

According to the aspect described above, the correction that causes the brightness at the first non-overlap region S4 to approach the brightness at the overlap region S3 can be performed when the first non-overlapping region S4 is darker than the overlapping region S3.

In the projection image adjustment method according to the first embodiment, the first image A1 and the second image A2 are each a monochromatic black image.

According to the aspect described above, in the situation in which the first projector 10 and the second projector 20 each project a monochromatic black image, the correction that makes the difference in brightness between the first non-overlap region S4 and the overlap region S3 noticeable can be suppressed.

B: Variations

Aspects of variations of the embodiment presented above by way of example will be presented below by way of example. Two or more aspects arbitrarily selected from those presented below by way of example may be combined with each other as appropriate to the extent that the aspects to be combined with each other do not contradict each other.

B1: First Variation

In the first embodiment, when the first non-overlap region S4 is brighter than the overlap region S3, the corrector 443 may perform third correction. The third correction is correction that adjusts the first image A1 but is not relevant to the first correction.

Figure 14:
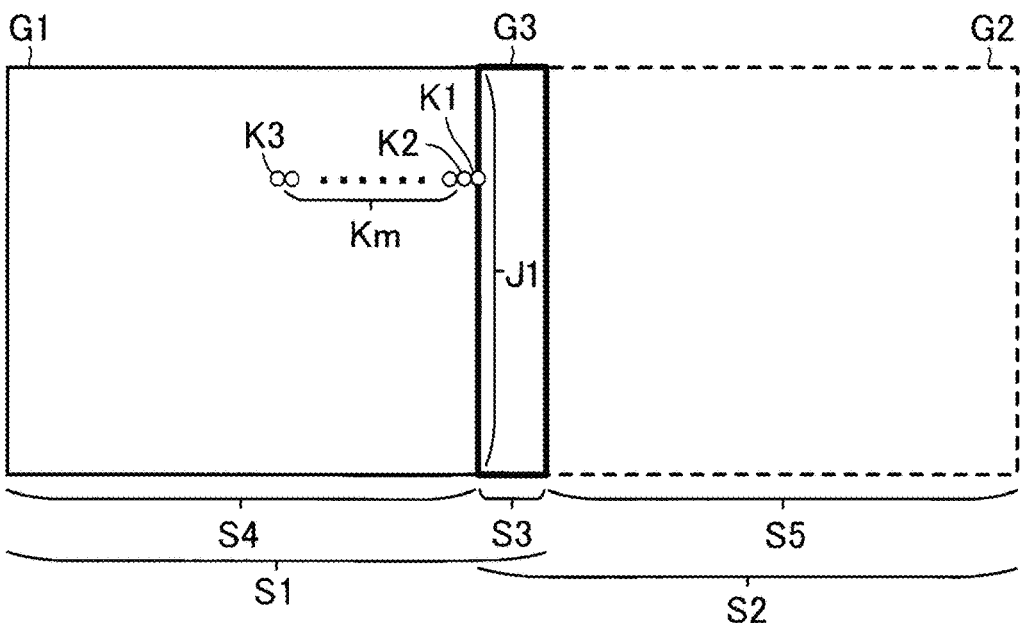
FIG. 14 shows a first region, a second region, an overlap region, a first non-overlap region, and a second non-overlap region.

FIG. 14 shows the first region S1, the second region S2, the overlap region S3, the first non-overlap region S4, and the second non-overlap region S5.

The first region S1 has a first contour G1. The first contour G1 is an example of the contour of the first region. The second region S2 has a second contour G2. The overlap region S3 has a third contour G3. The third contour G3 is an example of the contour of the third region. The third contour G3 has a first line J1, which does not overlap with the first contour G1 of the first region S1. A first point K1 is located on the first line J1. The position of the first point K1 on the first line J1 is any position on the first line J1. The position of the first point K1 on the first line J1 is therefore not limited to the position shown in FIG. 14. The position of the first point K1 on the first line J1 may be a position different from the position shown in FIG. 14. A plurality of first points K1 may be located on the first line J1.

The first non-overlap region S4 has a second point K2, a third point K3, and a point group Km. The second point K2 is a point adjacent to the first point K1. The position of the second point K2 is not limited to the position shown in FIG. 14. The position of the second point K2 changes in accordance with the position of the first point K1 on the first line J1. The third point K3 is a point at which the brightness in the first non-overlap region S4 is the highest. The highest brightness at the first non-overlap region S4 is, for example, the highest luminance at the first non-overlap region S4. The position of the third point K3 is not limited to the position shown in FIG. 14. The position of the third point K3 may change in accordance with the distribution of the brightness in the first non-overlap region S4. The distribution of the brightness at the first non-overlap region S4 is, for example, the distribution of the luminance at the first non-overlap region S4. The point group Km is a group of points located in the first non-overlap region S4 between the third point K3 and the second point K2. The point group Km has one or more points.

When the first non-overlap region S4 is brighter than the overlap region S3, the identifier 442 identifies the brightness at the second point K2, the highest brightness at the first non-overlap region S4, and the third point K3 based on the captured image.

For example, the identifier 442 identifies the luminance at the second point K2 as the brightness at the second point K2 based on the captured image. The identifier 442 identifies the highest luminance at the first non-overlap region S4 as the highest brightness at the first non-overlap region S4 based on the captured image.

The corrector 443 subsequently performs the third correction. The third correction is correction that adjusts the first image A1 to change the brightness at the point group Km and the brightness at the second point K2 to the brightness within a first range. The first range is a range within which the brightness is higher than the brightness at the second point K2 identified based on the captured image but lower than or equal to the brightness at the third point K3 identified based on the captured image. The brightness at the third point K3 is the highest brightness at the first non-overlap region S4.

Figure 15:
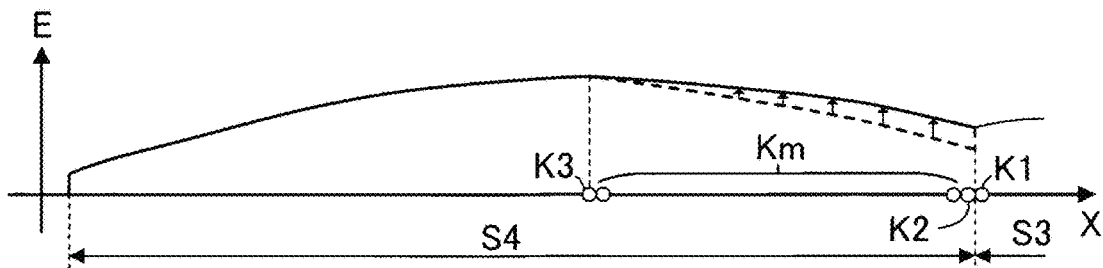
FIG. 15 describes an example of third correction.

FIG. 15 describes an example of the third correction. The identifier 442 identifies the brightness at the first point K1 based on the captured image before the example of the third correction shown in FIG. 15 is performed. For example, the identifier 442 identifies the luminance at the first point K1 as the brightness at the first point K1 based on the captured image.

The corrector 443 subsequently performs the example of the third correction shown in FIG. 15. For example, when the first point K1 is brighter than the second point K2, the corrector 443 performs correction that adjusts the first image A1 to increase stepwise the brightness at the point group Km and the brightness at the second point K2 from the brightness at the third point K3 toward the brightness at the second point K2 in such a way that the brightness at the second point K2 approaches the brightness at the first point K1 but the brightness at the point group Km and the brightness at the second point K2 keep falling within the first range. That is, the corrector 443 performs correction that increases stepwise within the first range the brightness at the point group Km and the brightness at the second point K2 from the brightness at the third point K3 toward the brightness at the second point K2.

As an example, the corrector 443 changes the brightness at the second point K2 to the brightness at the first point K1, and increases stepwise the brightness at the point group Km from the brightness at the third point K3 toward the brightness at the second point K2 in such a way that the brightness at the point group Km keeps falling within the first range by maintaining the luminance of the first image to overlap A1a in the first image A1 and partially adjusting the luminance of the first image not to overlap A1b in the first image A1.

During the third correction, the corrector 443 may cause the camera 30 to continuously capture images. In this case, the corrector 443 maintains the luminance of the first image to overlap A1a and partially adjusts the luminance of the first image not to overlap A1b in the first image A1 while monitoring the captured image continuously produced by the camera 30. The corrector 443 partially adjusts the luminance of the first image not to overlap A1b while monitoring the captured image to change the brightness at the second point K2 to the brightness at the first point K1, and increase stepwise the brightness at the point group Km from the brightness at the third point K3 toward the brightness at the second point K2 in such a way that the brightness at the point group Km keeps falling within the first range.

Figure 16:
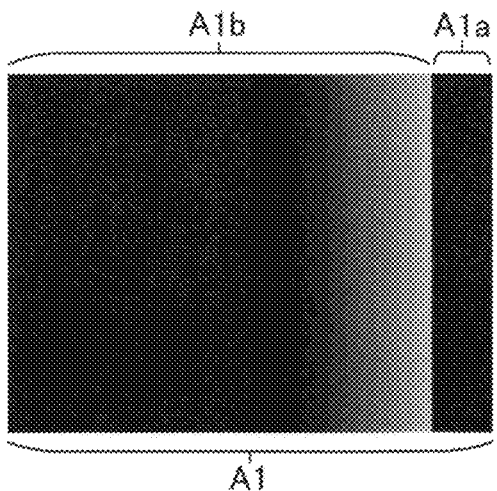
FIG. 16 shows an example of the first image having been adjusted by the third correction.

FIG. 16 shows an example of the first image A1 having been adjusted by the third correction. The adjustment using the third correction is performed on the first image not to overlap A1b, as shown in FIG. 16.

When a plurality of first points K1 are located on the first line J1, the third correction is performed for each of the first points K1 on the second point K2 and the point group Km corresponding to the first point K1.

The third correction is not limited to the example described above. For example, the corrector 443 first identifies a point group Km1 darker than the first point K1 out of the point group Km. The corrector 443 may subsequently change the first image not to overlap A1b to change the brightness at the point group Km1 and the brightness at the second point K2 to the brightness at the first point K1.

When the first point K1 is darker than the second point K2, the corrector 443, for example, does not perform the correction that adjusts the first image A1.

In the projection image adjustment method according to the first variation, the third contour G3 of the overlap region S3 has the first line J1, which does not overlap with the first contour G1 of the first region S1, the first non-overlap region S4 has the second point K2 adjacent to the first point K1 on the first line J1, and the third point K3 having the highest brightness at the first non-overlap region S4, the method further includes correcting the brightness at the point group Km located in the first non-overlap region S4 between the third point K3 and the second point K2 and the brightness at the second point K2 to the brightness within the first range by adjusting the first image A1 when the first non-overlap region S4 is brighter than the overlap region S3, and the first range is the range within which the brightness is higher than the brightness at the second point K2 identified based on the captured image but lower than or equal to the brightness at the third point K3 identified based on the captured image.

According to the aspect described above, the correction that produces brightness higher than the highest brightness at the first non-overlap region S4 is not performed on the points in the first non-overlap region S4. Making the difference in brightness between the first non-overlap region S4 and the overlap region S3 noticeable can therefore be avoided, as compared with the approach disclosed in JP-A-2014-137386. The projection image can therefore be adjusted in accordance with the relationship in terms of the magnitude of the brightness between the overlap region S3 and the first non-overlap region S4 irrespective of the shape of the projection surface S.

In the projection image adjustment method according to a first variation, correcting the brightness at the point group Km and the brightness at the second point K2 to the brightness within the first range by adjusting the first image A1 includes performing the correction that adjusts the first image A1 when the first point K1 is brighter than the second point K2 to increase stepwise the brightness at the point group Km and the brightness at the second point K2 from the brightness at the third point K3 toward the brightness at the second point K2 in such a way that the brightness at the second point K2 approaches the brightness at the first point K1 but the brightness at the point group Km and the brightness at the second point K2 keep falling within the first range.

According to the aspect described above, adjusting the first image A1 increases stepwise the brightness at the point group Km and the brightness at the second point K2 from the brightness at the third point K3 toward the brightness at the second point K2 with the brightness at the point group Km and the brightness at the second point K2 keeping falling within the first range. The change in brightness from the first non-overlap region S4 to the overlap region S3 is thus smoothly performed. The correction that makes the difference in brightness between the overlap region S3 and the first non-overlap region S4 less noticeable can therefore be achieved.

B2: Second Variation

In the first variation, the corrector 443 may perform the same adjustment as that performed on the first image A1 in the first variation on the second image A2.

In this case, the corrector 443 performs the adjustment to be performed on the second image A2 based not on the relationship in terms of brightness between the first non-overlap region S4 and the overlap region S3 but based on the relationship in terms of brightness between the second non-overlap region S5 and the overlap region S3.

Figure 17:
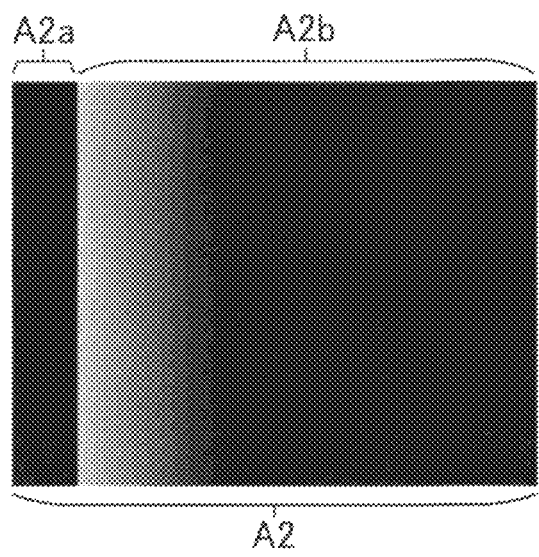
FIG. 17 shows an example of the second image after the adjustment.

FIG. 17 shows an example of the second image A2 after the adjustment. The adjustment performed on the second image A2 is performed on the second image not to overlap A2b, as shown in FIG. 17.

According to the aspect described above, the correction that makes the difference in brightness between the first non-overlap region S4 and the overlap region S3 and the difference in brightness between the second non-overlap region S5 and the overlap region S3 less noticeable can be achieved.

B3: Third Variation

In the first embodiment and the first and second variations, the correction performed when the first non-overlap region S4 is darker than the overlap region S3 is not limited to the first correction.

For example, when the first non-overlap region S4 is darker than the overlap region S3, and the brightness varies at the first non-overlap region S4, the corrector 443 may perform correction that adjusts the first image A1 to make the brightness across the entire surface of the first non-overlap region S4 equal to the highest brightness at the first non-overlap region S4. The correction described above can also reduce the difference in brightness between the first non-overlap region S4 and the overlap region S3 when the first non-overlap region S4 is darker than the overlap region S3.

B4: Fourth Variation

In the first embodiment and the first to third variations, the correction performed when the second non-overlap region S5 is darker than the overlap region S3 is not limited to the second correction.

For example, when the second non-overlap region S5 is darker than the overlap region S3, and the brightness varies at the second non-overlap region S5, the corrector 443 may perform correction that adjusts the second image A2 to make the brightness across the entire surface of the second non-overlap region S5 equal to the highest brightness at the second non-overlap region S5. The correction described above can also reduce the difference in brightness between the second non-overlap region S5 and the overlap region S3 when the second non-overlap region S5 is darker than the overlap region S3.

B5: Fifth Variation

In the first embodiment and the first to fourth variations, the information processing apparatus 40 may be incorporated into the first projector 10, the second projector 20, or the camera 30. Moreover, in the first embodiment and the first to fifth variations, at least the processing apparatus 440 out of the components of the information processing apparatus 40 may be incorporated into the first projector 10, the second projector 20, or the camera 30.

B6: Sixth Variation

In the first embodiment and the first to fifth variations, the projection system 1 may include one or more projectors in addition to the first projector 10 and the second projector 20. In this case, the projection system 1 displays a tiled image onto the projection surface S by using the images projected from the projectors. Adjacent images in the tiled image partially overlap with each other.

C: Summary of Present Disclosure

The present disclosure will be summarized below as additional remarks.

C1: Additional Remark 1

A projection image adjustment method including acquiring a captured image produced by capturing an image of a range containing a first region and a second region in a situation in which a first projector projects a first image having uniform luminance toward a first region of a projection surface and a second projector projects a second image having uniform luminance toward a second region that is part of the projection surface and has a portion that overlaps with part of the first region, identifying based on the captured image the brightness at a third region where the first region and the second region overlap with each other, and the brightness at a fourth region that is part of the first region and does not overlap with the second region, adjusting the first image when the fourth region is darker than the third region, and not performing correction that adjusts the first image to increase the highest brightness at the fourth region when the fourth region is brighter than the third region.

According to the projection image adjustment method described in the additional remark 1, when the fourth region, which is a non-overlap region, is brighter than the third region, which is an overlap region, the correction that adjusts the first image to increase the highest brightness at the fourth region is not performed. The correction that makes the difference in brightness between the fourth region and the third region noticeable can be suppressed when the fourth region is brighter than the third region.

C2: Additional Remark 2

The projection image adjustment method described in the additional remark 1, in which the contour of the third region has a first line that does not overlap with the contour of the first region, the fourth region has a first point on the first line, a second point adjacent to the first point, and a third point at which the brightness at the fourth region is the highest, the method further includes, when the fourth region is brighter than the third region, correcting the brightness at a point group located in the fourth region between the third point and the second point, and the brightness at the second point to the brightness within the first range by adjusting the first image, and the first range is the range within which the brightness is higher than the brightness at the second point identified based on the captured image but lower than or equal to the brightness at the third point identified based on the captured image.

According to the projection image adjustment method described in the additional remark 2, the correction that produces brightness higher than the highest brightness at the fourth region is not performed on the points in the fourth region. Making the difference in brightness between the fourth region, which is a non-overlap region, and the third region, which is an overlap region, noticeable can therefore be avoided, as compared with the approach disclosed in JP-A-2014-137386. The projection image can therefore be adjusted in accordance with the relationship in terms of the magnitude of the brightness between the third region and the fourth region irrespective of the shape of the projection surface.

C3: Additional Remark 3

The projection image adjustment method described in the additional remark 2, in which correcting the brightness at the point group and the brightness at the second point to the brightness within the first range by adjusting the first image includes, when the first point is brighter than the second point, performing correction that adjusts the first image to increase stepwise the brightness at the point group and the brightness at the second point from the brightness at the third point toward the brightness at the second point in such a way that the brightness at the second point approaches the brightness at the first point with the brightness at the point group and the brightness at the second point falling within the first range.

According to the projection image adjustment method described in the additional remark 3, when the first point is brighter than the second point, the first image is adjusted to increase stepwise the brightness at the point group located between the third point and the second point and the brightness at the second point from the brightness at the third point toward the brightness at the second point in such a way that the brightness at the second point approaches the brightness at the first point with the brightness at the point group and the brightness at the second point falling within the first range. The change in brightness from the fourth region to the third region is thus smoothly performed. The correction that makes the difference in brightness between the third region and the fourth region less noticeable can therefore be achieved.

C4: Additional Remark 4

The projection image adjustment method described in the additional remark 1, in which not performing the correction includes not performing the correction that adjusts the first image.

Applying the approach disclosed in JP-A-2014-137386 when the fourth region, which is anon-overlap region, is brighter than the third region, which is an overlap region, undesirably further increases the difference in brightness between the fourth region and the third region. According to the projection image adjustment method described in the additional remark 4, when the fourth region is brighter than the third region, the correction that adjusts the first image is not performed. Any further increase in the difference in brightness between the fourth region and the third region can therefore be avoided. According to the projection image adjustment method described in the additional remark 4, the load required for the adjustment of the first image can be reduced as compared with the load required in the configuration in which the first image is adjusted when the fourth region is brighter than the third region.

C5: Additional Remark 5

The projection image adjustment method described in any one of the additional remarks 1 to 4, in which the brightness at the third region is the average luminance at the third region, the brightness at the fourth region is the average luminance at the fourth region, and the highest brightness at the fourth region is the highest luminance at the fourth region.

According to the projection image adjustment method described in the additional remark 5, the adjustment of the first image can be controlled based on the relationship in terms of the magnitude of the average luminance between the third region and the fourth region. Therefore, for example, even when the luminance at part of the third region has a wrong value resulting from sudden noise, using the average luminance at the third region can lower the effect of the wrong value on the adjustment of the first image.

C6: Additional Remark 6

The projection image adjustment method described in any one of the additional remarks 1 to 4, in which the brightness at the third region is the highest luminance at the third region, the brightness at the fourth region is the highest luminance at the fourth region, and the highest brightness at the fourth region is the highest luminance at the fourth region.

According to the projection image adjustment method described in the additional remark 6, the adjustment of the first image can be controlled based on the relationship in terms of the magnitude of the highest luminance between the third region and the fourth region. Therefore, for example, the process of identifying the average luminance at the third region and the average luminance at the fourth region can be omitted.

C7: Additional Remark 7

The projection image adjustment method described in any one of the additional remarks 1 to 6, in which adjusting the first image when the fourth region is darker than the third region includes performing correction that adjusts the first image to increase the highest brightness at the fourth region when the fourth region is darker than the third region.

According to the projection image adjustment method described in the additional remark 7, when the fourth region is darker than the third region, the correction that causes the brightness at the fourth region to approach the brightness at the third region can be performed.

C8: Additional Remark 8

The projection image adjustment method described in any one of the additional remarks 1 to 7, in which the first and second images are each a monochromatic black image.

According to the projection image adjustment method described in the additional remark 8, in the situation in which the first projector and the second projector each project a monochromatic black image, the correction that makes the difference in brightness between the fourth region and the third region noticeable can be suppressed.

C9: Additional Remark 9

A projection system including a first projector that projects a first image having uniform luminance toward a first region of a projection surface, a second projector that projects a second image having uniform luminance toward a second region that is part of the projection surface and has a portion that overlaps with part of the first region, a camera that produce a captured image by capturing an image of a range containing the first region and the second region in a situation in which the first image is projected toward the first region and the second image is projected toward the second region, and a processing apparatus that performs acquisition of the captured image, identification, based on the captured image, of the brightness at a third region where the first region and the second region overlap with each other, and the brightness at a fourth region that is part of the first region and does not overlap with the second region, and adjustment of the first image when the fourth region is darker than the third region, and does not perform correction that increases the highest brightness at the fourth region by adjusting the first image when the fourth region is brighter than the third region.

According to the projection system described in the additional remark 9, when the fourth region, which is a non-overlap region, is brighter than the third region, which is an overlap region, the correction that adjusts the first image to increase the highest brightness at the fourth region is not performed. The correction that makes the difference in brightness between the fourth region and the third region noticeable can be suppressed when the fourth region is brighter than the third region.

C10: Additional Remark 10

A processing apparatus that performs acquisition of a captured image produced by capturing an image of a range containing a first region and a second region in a situation in which a first projector projects a first image having uniform luminance toward a first region of a projection surface and a second projector projects a second image having uniform luminance toward a second region that is part of the projection surface and has a portion that overlaps with part of the first region, identification, based on the captured image, of the brightness at a third region where the first region and the second region overlap with each other, and the brightness at a fourth region that is part of the first region and does not overlap with the second region, and adjustment of the first image when the fourth region is darker than the third region, and does not perform correction that increases the highest brightness at the fourth region by adjusting the first image when the fourth region is brighter than the third region.

According to the proceeding apparatus described in the additional remark 10, when the fourth region, which is a non-overlap region, is brighter than the third region, which is an overlap region, the correction that adjusts the first image to increase the highest brightness at the fourth region is not performed. The correction that makes the difference in brightness between the fourth region and the third region noticeable can be suppressed when the fourth region is brighter than the third region.

C11: Additional Remark 11

Anon-transitory computer-readable storage medium storing a program that causes a computer to perform acquisition of a captured image produced by capturing an image of a range containing a first region and a second region in a situation in which a first projector projects a first image having uniform luminance toward a first region of a projection surface and a second projector projects a second image having uniform luminance toward a second region that is part of the projection surface and has a portion that overlaps with part of the first region, identification, based on the captured image, of the brightness at a third region where the first region and the second region overlap with each other, and the brightness at a fourth region that is part of the first region and does not overlap with the second region, and adjustment of the first image when the fourth region is darker than the third region, and causes the computer not to perform correction that increases the highest brightness at the fourth region by adjusting the first image when the fourth region is brighter than the third region.

According to the non-transitory computer-readable storage medium storing a program described in the additional remark 11, when the fourth region, which is a non-overlap region, is brighter than the third region, which is an overlap region, the correction that adjusts the first image to increase the highest brightness at the fourth region is not performed. The correction that makes the difference in brightness between the fourth region and the third region noticeable can be suppressed when the fourth region is brighter than the third region.

What is claimed is:

1. A projection image adjustment method comprising:

acquiring a captured image produced by capturing an image of a range containing a first region and a second region in a situation in which a first projector projects a first image having uniform luminance toward a first region of a projection surface and a second projector projects a second image having uniform luminance toward a second region that is part of the projection surface and has a portion that overlaps with part of the first region;

identifying based on the captured image brightness at a third region where the first region and the second region overlap with each other, and brightness at a fourth region that is part of the first region and does not overlap with the second region;

adjusting the first image when the fourth region is darker than the third region; and not performing correction that adjusts the first image to increase highest brightness at the fourth region when the fourth region is brighter than the third region.

2. The projection image adjustment method according to claim 1, wherein a contour of the third region has a first line that does not overlap with a contour of the first region, the fourth region has a first point on the first line, a second point adjacent to the first point, and a third point at which the brightness at the fourth region is the highest, the method further includes, when the fourth region is brighter than the third region, correcting brightness at a point group located in the fourth region between the third point and the second point, and brightness at the second point to brightness within the first range by adjusting the first image, and the first range is a range within which the brightness is higher than the brightness at the second point identified based on the captured image but lower than or equal to the brightness at the third point identified based on the captured image.

3. The projection image adjustment method according to claim 2, wherein correcting the brightness at the point group and the brightness at the second point to the brightness within the first range by adjusting the first image includes, when the first point is brighter than the second point, performing correction that adjusts the first image to increase stepwise the brightness at the point group and the brightness at the second point from the brightness at the third point toward the brightness at the second point in such a way that the brightness at the second point approaches the brightness at the first point with the brightness at the point group and the brightness at the second point falling within the first range.

4. The projection image adjustment method according to claim 1, wherein not performing the correction includes not performing the correction that adjusts the first image.

5. The projection image adjustment method according to claim 1, wherein the brightness at the third region is average luminance at the third region, the brightness at the fourth region is average luminance at the fourth region, and the highest brightness at the fourth region is highest luminance at the fourth region.

6. The projection image adjustment method according to claim 1, wherein the brightness at the third region is highest luminance at the third region, the brightness at the fourth region is highest luminance at the fourth region, and the highest brightness at the fourth region is highest luminance at the fourth region.

7. The projection image adjustment method according to claim 1, wherein adjusting the first image when the fourth region is darker than the third region includes performing correction that adjusts the first image to increase the highest brightness at the fourth region when the fourth region is darker than the third region.

8. The projection image adjustment method according to claim 1,
wherein the first and second images are each a monochromatic black image.

9. A projection system comprising:
a first projector that projects a first image having uniform luminance toward a first region of a projection surface;
a second projector that projects a second image having uniform luminance toward a second region that is part of the projection surface and has a portion that overlaps with part of the first region;
a camera that produce a captured image by capturing an image of a range containing the first region and the second region in a situation in which the first image is projected toward the first region and the second image is projected toward the second region; and
a processing apparatus that performs acquisition of the captured image,
identification, based on the captured image, of brightness at a third region where the first region and the second region overlap with each other, and brightness at a fourth region that is part of the first region and does not overlap with the second region, and
adjustment of the first image when the fourth region is darker than the third region, and

28 does not perform correction that increases highest brightness at the fourth region by adjusting the first image when the fourth region is brighter than the third region.

10. A non-transitory computer-readable storage medium storing a program that causes a computer to perform
acquisition of a captured image produced by capturing an image of a range containing a first region and a second region in a situation in which a first projector projects a first image having uniform luminance toward a first region of a projection surface and a second projector projects a second image having uniform luminance toward a second region that is part of the projection surface and has a portion that overlaps with part of the first region,
identification, based on the captured image, of brightness at a third region where the first region and the second region overlap with each other, and brightness at a fourth region that is part of the first region and does not overlap with the second region, and
adjustment of the first image when the fourth region is darker than the third region, and
causes the computer not to perform correction that increases highest brightness at the fourth region by adjusting the first image when the fourth region is brighter than the third region.

* * * * *